(12) United States Patent
Fan et al.

(10) Patent No.: US 11,264,813 B2
(45) Date of Patent: Mar. 1, 2022

(54) CHARGING CIRCUIT, TERMINAL AND CHARGING METHOD

(71) Applicant: Beijing Xiaomi Mobile Software Co., Ltd., Beijing (CN)

(72) Inventors: Jie Fan, Beijing (CN); Zhiwu Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 286 days.

(21) Appl. No.: 16/520,658

(22) Filed: Jul. 24, 2019

(65) Prior Publication Data

US 2020/0036199 A1    Jan. 30, 2020

(30) Foreign Application Priority Data

Jul. 27, 2018    (CN) .......................... 201810846247.3

(51) Int. Cl.
*H02J 7/00*    (2006.01)

(52) U.S. Cl.
CPC .............. *H02J 7/0029* (2013.01); *H02J 7/00* (2013.01); *H02J 7/007* (2013.01); *H02J 7/00302* (2020.01)

(58) Field of Classification Search
CPC ............. H02J 7/00; H02J 7/007; H02J 7/0029
See application file for complete search history.

(56) References Cited

U.S. PATENT DOCUMENTS

| 8,344,790 B2 | 1/2013 | Li |
| 9,484,758 B2 | 11/2016 | Chen et al. |

(Continued)

FOREIGN PATENT DOCUMENTS

| CN | 101694961 A | 4/2010 |
| CN | 102684481 A | 9/2012 |

(Continued)

OTHER PUBLICATIONS

Search Report and Written Opinion of the International Searching Authority of PCT Application No. PCT/CN2018/106199, dated Feb. 12, 2019, issued by the ISA/CN—State Intellectual Property Office of the P.R. China.

Dima, K., et al., "*Digital Pulse Frequency Modulation for Switched Capacitor DC-DC Converter on 65 nm Process*", Khalifa University of Science, Technology and Research, Abu Dhabi, UAE, pp. 642-645.

(Continued)

*Primary Examiner* — Robert Grant
(74) *Attorney, Agent, or Firm* — Finnegan, Henderson, Farabow, Garrett & Dunner, L.L.P.

(57) ABSTRACT

The present disclosure discloses a charging circuit, a terminal and a charging method, and belongs to a field of electronic circuit technologies. The charging circuit includes: a control circuit and a voltage reduction circuit connected to the control circuit; wherein the control circuit is configured to obtain a feedback signal indicating a generation frequency of a control signal, generate the control signal based on the feedback signal, and send the control signal to the voltage reduction circuit; and the voltage reduction circuit is configured to obtain an input voltage and the control signal, perform voltage reduction processing on the input voltage based on the control signal and output an output voltage to a battery, wherein an output current corresponding to the output voltage is greater than an input current corresponding to the input voltage, and the output voltage is configured to determine the generation frequency.

16 Claims, 7 Drawing Sheets

(56) References Cited

U.S. PATENT DOCUMENTS

2014/0217959 A1* 8/2014 Chen .................. H02M 3/1582
  320/107
2016/0254689 A1 9/2016 Lee et al.

FOREIGN PATENT DOCUMENTS

| | | |
|---|---|---|
| CN | 108233456 A | 6/2018 |
| CN | 207518328 U | 6/2018 |
| CN | 108988426 A | 12/2018 |
| JP | S57110076 A | 7/1982 |
| JP | 2004328901 A | 11/2004 |
| JP | 2008508841 A | 3/2008 |
| JP | 2009089578 A | 4/2009 |
| JP | 2009124827 A | 6/2009 |
| JP | 2015154627 A | 8/2015 |
| JP | 2017216812 A | 12/2017 |
| JP | 2018500872 A | 1/2018 |
| JP | 2018113845 A | 7/2018 |

OTHER PUBLICATIONS

Extended Search Report for European Application No. 19188230.7 from the European Patent Office, dated Nov. 15, 2019.
First Office Action for Russian Application No. 2019124633, dated Apr. 13, 2020.
First Office Action for Chinese Application No. 201810846247.3, dated Mar. 20, 2020.
First Office Action for Indian Application No. 201947027076, dated Jul. 17, 2020.
First Office Action for Korean Application No. 1020187037701, dated Sep. 15, 2020.
First Office Action for Japanese Application No. 2018559961, dated Sep. 25, 2020.
Dahlquist, F. et al., *A JBS Diode with Controlled Forward Temperature Coefficient and Surge Current Capability*, Materials Science Forum, vols. 389-393 (2002), Trans Tech Publications, Switzerland, 5 pages.

* cited by examiner

US 11,264,813 B2

CHARGING CIRCUIT, TERMINAL AND CHARGING METHOD

CROSS-REFERENCE TO RELATED APPLICATIONS

This application is based on and claims priority to Chinese Patent Application Serial No. 201810846247.3, filed on Jul. 27, 2018, the entire contents of which are incorporated herein by reference.

TECHNICAL FIELD

The present disclosure relates to the field of electronic circuit technologies, and more particularly to a charging circuit, a terminal and a charging method.

BACKGROUND

A charging circuit in a terminal is configured to cooperate with a charger to effectively charge a battery in the terminal.

The charging circuit in the related art may be a low voltage charging circuit or a high voltage charging circuit. The low voltage charging circuit provides a relatively low charging current, resulting in a slow charging speed and poor user experience. The high voltage charging circuit provides a relatively high charging current. Although the charging speed may be improved, since the higher the charging current is, the thicker the charging line is, resulting in a higher cost of the charging line.

SUMMARY

To solve the problems in the related art, the present disclosure provides a charging circuit, a terminal and a charging method.

According to a first aspect of embodiments of the present disclosure, a charging circuit includes: a control circuit and a voltage reduction circuit connected to the control circuit. The control circuit is configured to obtain a feedback signal indicating a generation frequency of a control signal, generate the control signal based on the feedback signal, and send the control signal to the voltage reduction circuit. The voltage reduction circuit is configured to obtain an input voltage and the control signal, perform voltage reduction processing on the input voltage based on the control signal and output an output voltage to a battery, wherein an output current corresponding to the output voltage is greater than an input current corresponding to the input voltage, and the output voltage is configured to determine the generation frequency.

According to a second aspect of embodiments of the present disclosure, a terminal includes the charging circuit described in the first aspect.

According to a third aspect of embodiments of the present disclosure, a charging method, applicable to the terminal described in the second aspect, includes: obtaining a feedback signal indicating a generation frequency of a control signal, and generating the control signal based on the feedback signal; obtaining an input voltage; performing voltage reduction processing on the input voltage based on the control signal to obtain an output voltage, wherein an output current corresponding to the output voltage is greater than an input current corresponding to the input voltage, and the output voltage is configured to determine the generation frequency; and outputting the output voltage to a battery.

It should be understood that the general description above and the detailed description below are only exemplary, and are not intended to limit the present disclosure.

BRIEF DESCRIPTION OF THE DRAWINGS

The accompanying drawings herein, which are incorporated into the specification and constitute part of the specification, illustrate embodiments of the present disclosure, and together with the specification, explain principle of the present disclosure.

DETAILED DESCRIPTION

Figure 1:
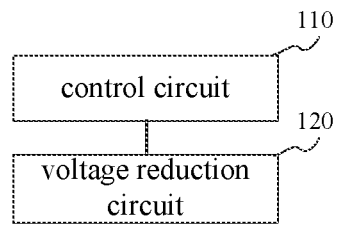
FIG. 1 is a block diagram illustrating a charging circuit according to an embodiment of the present disclosure.

Description will be made in detail below to explain exemplary embodiments. Examples of embodiments are illustrated in the accompanying drawings. Throughout the specification, unless specified otherwise, the same reference numerals in different accompanying drawings represent the same or similar elements. The implementations described below in the exemplary embodiments do not represent all implementations consistent with the present disclosure. On the contrary, they are merely examples of devices and methods described in the accompanying claims and consistent with aspects of the present disclosure.

FIG. 1 is a block diagram illustrating a charging circuit according to an embodiment of the present disclosure, and the charging circuit may be applied to a terminal. As illustrated in FIG. 1, the charging circuit includes: a control circuit 110 and a voltage reduction circuit 120 connected to the control circuit 110.

The control circuit 110 is configured to obtain a feedback signal indicating a generation frequency of a control signal, generate the control signal based on the feedback signal, and send the control signal to the voltage reduction circuit 120.

The voltage reduction circuit 120 is configured to obtain an input voltage and the control signal, perform voltage reduction processing on the input voltage based on the control signal and output an output voltage to a battery, in which, an output current corresponding to the output voltage is greater than an input current corresponding to the input voltage, and the output voltage is configured to determine the generation frequency.

With the charging circuit provided in the present disclosure, the voltage reduction processing is performed by the voltage reduction circuit on the input current and then the output current is outputted. Since the output current corresponding to the output voltage is greater than the input current corresponding to the input voltage, the output current may be increased when the voltage reduction processing is performed on the input voltage, so as to enable the output current to be high while the input current is low. In this way, charging efficiency of the battery may be improved with a higher output current, and a charging line may be made thinner when the input current is lower, such that cost of the charging line is reduced.

Figure 2:
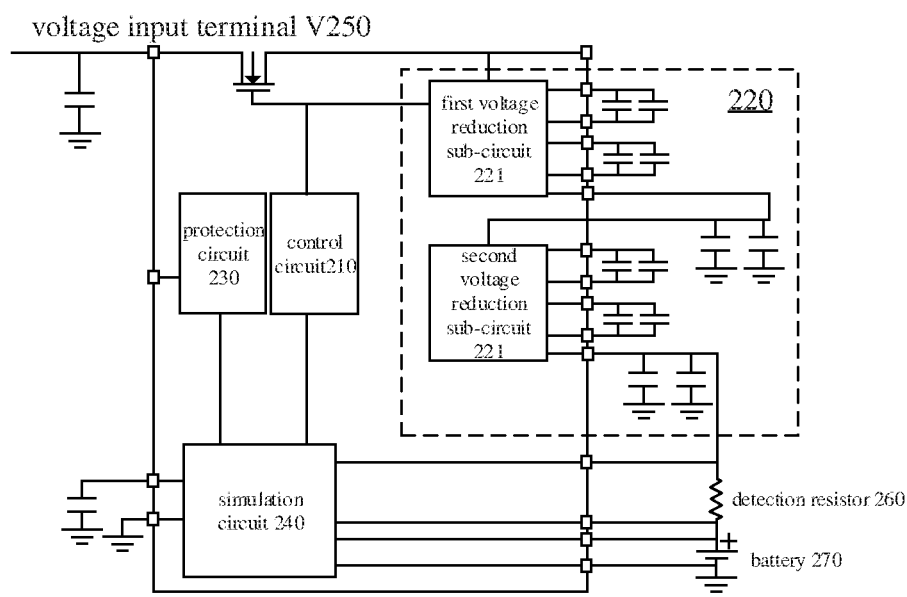
FIG. 2 is a schematic diagram illustrating a charging circuit according to another embodiment of the present disclosure.

FIG. 2 is a schematic diagram illustrating a charging circuit according to another embodiment of the present disclosure, and the charging circuit may be applied to a terminal. As illustrated in FIG. 2, the charging circuit includes: a control circuit 210 and a voltage reduction circuit 220 connected to the control circuit 210.

The control circuit 210 is configured to obtain a feedback signal indicating a generation frequency of a control signal, generate the control signal based on the feedback signal, and send the control signal to the voltage reduction circuit 220.

The control signal is configured to control the voltage reduction circuit 220 to perform voltage reduction processing on the input voltage. The control signal may be configured to control a timing of switching on and off a switch when the voltage reduction circuit 220 implements the voltage reduction processing by the switch. Description will be made below in detail.

The generation frequency of the control signal is related to an output voltage. The generation frequency of the control signal may be increased when the output voltage needs to be increased; the generation frequency of the control signal may be reduced when the output voltage needs to be reduced. Description will be made below in detail.

The voltage reduction circuit 220 is configured to obtain the input voltage and the control signal, perform voltage reduction processing on the input voltage based on the control signal and output an output voltage to a battery 270. An output current corresponding to the output voltage is greater than an input current corresponding to the input voltage, and the output voltage is configured to determine the generation frequency.

The input voltage of the voltage reduction circuit 220 is provided after a charger of the terminal is connected to a power supply, which may be a direct current voltage obtained after the charger converts an alternating current voltage. Since voltage reduction processing may be performed on the input voltage in embodiments of the present disclosure, the output voltage outputted to the battery 270 is within a range of a rated voltage (such as 4.4V) of the battery 270. The input voltage may be a voltage not exceeding a safety voltage threshold (such as 36V) specified by, e.g., the national standard, such as 14-22V, which is not limited in embodiments.

In the embodiments, the output current is greater than the input current after the voltage reduction circuit 220 performs voltage reduction processing on the input voltage. In this way, the charging efficiency of the battery 270 may be improved with a higher output current, and the charging line may be made thinner when the input current is lower, such that cost of the charging line is reduced.

The voltage reduction circuit 220 includes at least two cascaded voltage reduction sub-circuits 221. An output voltage of the voltage reduction sub-circuit 221 is half of an input voltage inputted to the voltage reduction sub-circuit 221, and an output current of the voltage reduction sub-circuit 221 is double of an input current of the voltage reduction sub-circuit 221.

In the embodiments, the voltage reduction circuit 220 includes at least two voltage reduction sub-circuits 221. The voltage reduction sub-circuits 221 have the same structure and are cascaded with each other. That is, an input terminal of a first voltage reduction sub-circuit 221 is configured as an input terminal of the voltage reduction circuit 220, an output terminal of the first voltage reduction sub-circuit 221 is configured as an input terminal of a second voltage reduction sub-circuit 221, an output terminal of the second voltage reduction sub-circuit 221 is configured as an input terminal of a third voltage reduction sub-circuit 221 and so on, and then an output terminal of the last voltage reduction sub-circuit 221 is configured as an output terminal of the voltage reduction circuit 220.

The number of voltage reduction sub-circuits included in the voltage reduction circuit 220 will be explained below. The rated voltage of the battery 270 is, for example, about 4.4V. Under an ideal premise that there is no loss of energy, the input voltage of the voltage reduction circuit 220 is 8.8V when there is a voltage reduction sub-circuit 221; the input voltage of the voltage reduction circuit 220 is 17.6V when there are two voltage reduction sub-circuits 221; the input voltage of the voltage reduction circuit 220 is 35.2V when there are three voltage reduction sub-circuits 221; the input voltage of the voltage reduction circuit 220 is 70.4V (which is greater than the safety voltage threshold 36V) when there are four voltage reduction sub-circuits 221. Therefore, the voltage reduction circuit 220 may include at most three voltage reduction sub-circuits 221. The above calculation is performed under the premise that there is no loss of energy. Since there is generally loss of energy, when the output voltage of the voltage reduction circuit 220 is required to be 4.4V, the input voltage of the voltage reduction circuit 220 will be greater than 36V. To ensure safety, the voltage reduction circuit 220 is provided to include two voltage reduction sub-circuits 221.

The voltage reduction sub-circuit 221 includes a switching circuit, a first capacitive circuit and a second capacitive circuit, the first capacitive circuit and the second capacitive circuit are respectively connected to the switching circuit, and a capacitance value of the first capacitive circuit is equal to that of the second capacitive circuit. The first capacitive circuit and the second capacitive circuit are connected in series when the switching circuit is in a first state; the first capacitive circuit and the second capacitive circuit are connected in parallel when the switching circuit is in a second state.

In the embodiments, by designing the structure of the switching circuit, the first capacitive circuit and the second capacitive circuit are connected in series when the switching circuit is in the first state; and the first capacitive circuit and the second capacitive circuit are connected in parallel when the switching circuit is in the second state.

Taking the switching circuit including four switches as an example, illustration is made to the structure of the switching circuit.

Figure 3:
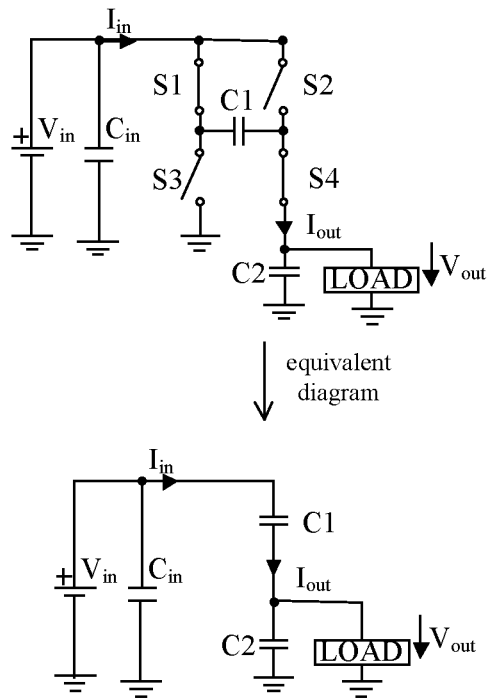
FIG. 3 is a schematic diagram illustrating a voltage reduction sub-circuit according to an embodiment of the present disclosure.

As illustrated in FIG. 3, for each voltage reduction sub-circuit 221, the voltage reduction sub-circuit 221 includes a first switch S1, a second switch S2, a third switch S3, a fourth switch S4, a first capacitive circuit C1 and a second capacitive circuit C2. A first end of the first switch S1 and a first end of the second switch S2 are respectively configured as input terminals of the voltage reduction sub-circuit 221, a second end of the first switch S1 is respectively connected to a first end of the first capacitive circuit C1 and a first end of the third switch S3, a second end of the third switch S3 is grounded, a second end of the second switch S2 is respectively connected to a second end of the first capacitive circuit C1 and a first end of the fourth switch S4, and a second end of the fourth switch S4 is configured as an output terminal of the voltage reduction sub-circuit 221; a first end of the second capacitive circuit C2 is connected to the second end of the fourth switch S4, and a second end of the second capacitive circuit C2 is grounded.

As illustrated in FIG. 3, $V_{in}$ is an input voltage, $V_{out}$ is an output voltage, $I_{in}$ is an input current, and $I_{out}$ is an output current, in which $V_{out}=\frac{1}{2}V_{in}$, $I_{out}=2I_{in}$. The capacitive circuit may be a capacitor, and may further be other components, which is not limited in embodiments. FIG. 3 illustrates an example in which both the first capacitive circuit and the second capacitive circuit are capacitors.

LOAD in FIG. 3 indicates a load. When the voltage reduction circuit 220 includes two voltage reduction sub-circuits 221, for the first voltage reduction sub-circuit 221, LOAD refers to the second voltage reduction sub-circuit 221 and the battery 270; for the second voltage reduction sub-circuit 221, LOAD refers to the battery 270.

Figure 4:
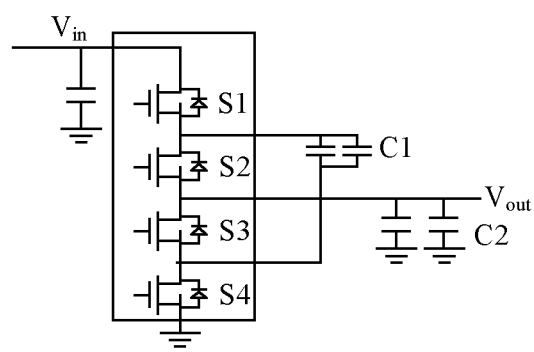
FIG. 4 is a schematic diagram illustrating a voltage reduction sub-circuit according to an embodiment of the present disclosure.

Each of the first switch S1, the second switch S2, the third switch S3 and the fourth switch S4 in FIG. 3 may be implemented by a MOS (Mosfet), and in this case, the voltage reduction sub-circuit 221 is equivalent to a circuit illustrated in FIG. 4.

The first capacitive circuit C1 may be implemented by one capacitor, and may further be implemented by at least two capacitors connected in parallel. A sum of capacitance values of the at least two capacitors connected in parallel when the first capacitive circuit C1 is implemented by the at least two capacitors connected in parallel is equal to a capacitance value of the capacitor when the first capacitive circuit C1 is implemented by one capacitor. Similarly, the second capacitive circuit C2 may be implemented by one capacitor, and may further be implemented by at least two capacitors connected in parallel. A sum of capacitance values of the at least two capacitors connected in parallel when the second capacitive circuit C2 is implemented by the at least two capacitors connected in parallel is equal to a capacitance value of the capacitor when the second capacitive circuit C2 is implemented by one capacitor.

The capacitive circuit $C_{in}$ may be connected in parallel after the input voltage. The capacitive circuit $C_{in}$ may have two effects. A first effect is to filter out a high frequency signal. Since the input voltage is a direct current voltage obtained after the charger converts the alternating current voltage, which may include a small amount of high frequency signals, it may be needed to filter out the high frequency signals by the capacitive circuit $C_{in}$. A second effect is to reduce a ripple. Since the direct current voltage is formed by the alternating current voltage after rectification and voltage regulation, some alternating current components may be included in the direct current component, and the alternating current components superimposed on the direct current component are called the ripple, which may need to be reduced by the capacitive circuit $C_{in}$. For the first voltage reduction circuit 221, the capacitance value of the capacitive circuit $C_{in}$ is low, which may be set as a few picofarads (pF).

In the embodiments, due to energy storage performance of the capacitive circuit and switching of the switching MOS, storing and releasing of the energy can be implemented, and the effect halving the voltage and doubling the current is implemented by switching the capacitive circuit to be connected in series or to be connected in parallel.

Illustration will be made below to the operating principle of the voltage reduction sub-circuit 221.

The first capacitive circuit C1 and the second capacitive circuit C2 connected in series are in a charging state of being charged from the input voltage of the voltage reduction sub-circuit 221 when the control signal is configured to control the first switch S1 and the fourth switch S4 to be switched on, and the second switch S2 and the third switch S3 to be switched off. FIG. 3 illustrates an example in which both the first capacitive circuit and the second capacitive circuit are capacitors. In this case, the first capacitor C1 and the second capacitor C2 are connected in series. Since a capacitance value of the first capacitor C1 is equivalent to that of the second capacitor C2, it is equivalent to charging the first capacitor C1 and the second capacitor C2 at the same time, and the energy stored in the first capacitor C1 and the energy stored in the second capacitor C2 are equal. That is, both voltages of the first capacitor C1 and the second capacitor C2 are half of the input voltage of the voltage reduction sub-circuit 221, and both the current flowing through the first capacitor C1 and the current flowing through the second capacitor C2 are equal to the input current of the voltage reduction sub-circuit 221.

Figure 5:
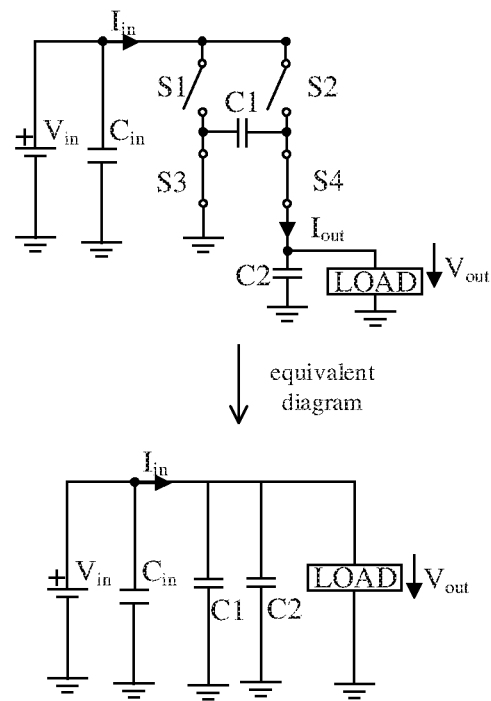
FIG. 5 is a schematic diagram illustrating a voltage reduction sub-circuit according to an embodiment of the present disclosure.

The first capacitive circuit C1 and the second capacitive circuit C2 connected in parallel are in a discharging state of outputting voltage to the battery 270 when the control signal is configured to control the third switch S3 and the fourth switch S4 to be switched on, and the first switch S1 and the second switch S2 to be switched off. FIG. 5 illustrates an example in which both the first capacitive circuit and the second capacitive circuit are capacitors. In this case, the first capacitor C1 and the second capacitor C2 are connected in parallel. Since the energy stored in the first capacitor C1 and the energy stored in the second capacitor C2 are equal, both the voltage of the first capacitor C1 and the voltage of the second capacitor C2 are half of the input voltage of the voltage reduction sub-circuit 221. That is, the output voltage of the voltage reduction sub-circuit 221 is half of the input voltage of the voltage reduction sub-circuit 221. Both the current flowing through the first capacitor C1 and the current flowing through the second capacitor C2 are equal to the input current of the voltage reduction sub-circuit 221, that is, the output current of the voltage reduction sub-circuit 221 is twice the intensity of the input current of the voltage reduction sub-circuit 221.

Figure 6:
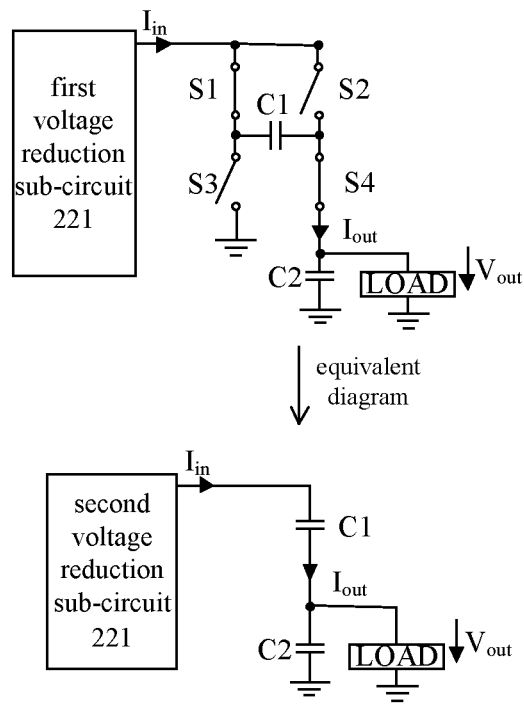
FIG. 6 is a schematic diagram illustrating a voltage reduction sub-circuit according to an embodiment of the present disclosure.
Figure 7:
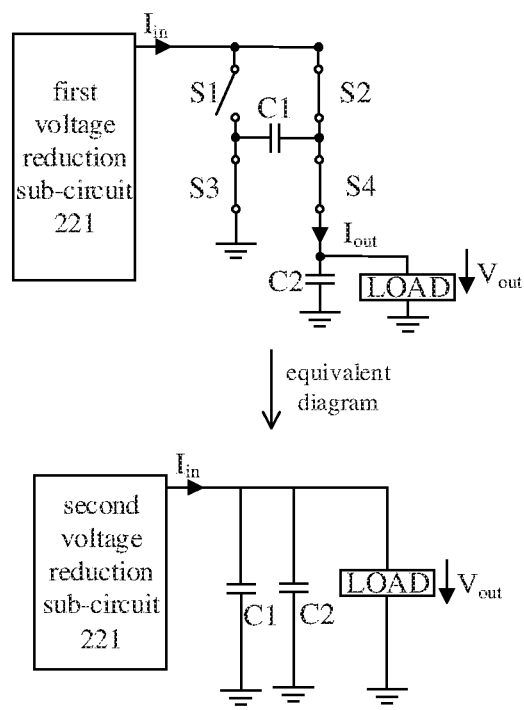
FIG. 7 is a schematic diagram illustrating a voltage reduction sub-circuit according to an embodiment of the present disclosure.

The input voltage of the voltage reduction sub-circuit 221 is the input voltage of the voltage reduction circuit 220, i.e., $V_{in}$ in FIG. 3, when the voltage reduction sub-circuit 221 is the first voltage reduction sub-circuit 221; the input voltage of the voltage reduction sub-circuit 221 is the output voltage of the first voltage reduction sub-circuit 221 when the voltage reduction sub-circuit 221 is the second voltage reduction sub-circuit 221, as illustrated in FIG. 6 and FIG. 7, an input source of energy is the first voltage reduction sub-circuit 221.

Although the work principle of each voltage reduction sub-circuit 221 is same, different capacitive circuits may be configured for each voltage reduction sub-circuit according to a cascading position of the voltage reduction sub-circuit 221 in the voltage reduction circuit 220. A withstand voltage value of the capacitive circuit in the preceding voltage reduction sub-circuit 221 is greater than that of the capacitive circuit in the succeeding voltage reduction sub-circuit 221, and considering loss of energy, an energy storage capacity of the capacitive circuit in the preceding voltage reduction sub-circuit 221 is greater than that of the capacitive circuit in the succeeding voltage reduction sub-circuit 221.

In addition, to transmit the energy to the following voltage reduction sub-circuit 221 fast, it is required that the operating frequency of the voltage reduction sub-circuit 221 is greater than that of the following voltage reduction sub-circuit 221, in which the operating frequency is a frequency switching on and off the switch in the voltage reduction sub-circuit 221. The operating frequency herein may be calculated based on an experience value or a preset algorithm, which is not limited in embodiments.

Figure 8:
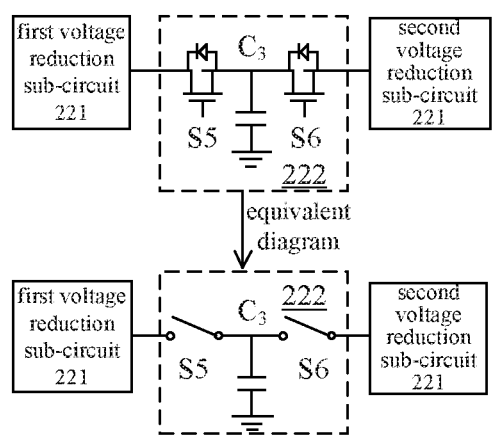
FIG. 8 is a schematic diagram illustrating a voltage reduction circuit according to an embodiment of the present disclosure.

In some embodiments, a voltage applied to the battery 270 may be increased when the at least two voltage reduction sub-circuits 221 work simultaneously, such that the voltage is greater than the rated voltage of the battery 270, resulting in damage of the battery 270. Therefore, to ensure that respective voltage reduction sub-circuits 221 work reasonably, as illustrated in FIG. 8, the voltage reduction circuit 220 may further include an energy transfer circuit 222, and the energy transfer circuit 222 is located between two neighboring voltage reduction sub-circuits 221. The energy transfer circuit 222 includes a fifth switch S5, a sixth switch S6, and a third capacitive circuit C3; a first end of the fifth switch S5 is connected to an output end of a preceding one of the two neighboring voltage reduction sub-circuits 221, a second end of the fifth switch S5 is respectively connected to a first end of the third capacitive circuit C3 and a first end of the sixth switch S6, a second end of the third capacitive circuit C3 is grounded, and a second end of the sixth switch S6 is connected to an input end of a succeeding one of the two neighboring voltage reduction sub-circuits 221.

The fifth switch S5 and the sixth switch S6 may be implemented by the MOS switches. A capacitance value of the third capacitive circuit C3 is greater than that of the first capacitive circuit C1 and that of the second capacitive circuit C2, and a withstand voltage value of the third capacitive circuit C3 is greater than that of the first capacitive circuit C1 and that of the second capacitive circuit C2. In FIG. 8, the third capacitive circuit is a capacitor as an example.

Illustration will be made below to the principle of the energy transfer circuit 222.

The third capacitive circuit C3 is in a charging state of being charged from the preceding voltage reduction sub-circuit 221 when the control signal is configured to control the fifth switch S5 to be switched on, and the sixth switch S6 to be switched off. In this case, the first capacitive circuit C1 and the second capacitive circuit C2 in the preceding voltage reduction sub-circuit 221 output the energy stored therein to the third capacitive circuit C3. The third capacitive circuit C3 is in a discharging state of outputting voltage to the succeeding voltage reduction sub-circuit 221 when the control signal is configured to control the fifth switch S5 to be switched off, and the sixth switch S6 to be switched on. In this case, the third capacitive circuit C3 outputs the energy stored therein to the first capacitive circuit C1 and the second capacitive circuit C2 in the succeeding voltage reduction sub-circuit 221.

It should be noted that, in addition to the effect of the transfer energy, the third capacitive circuit C3 may further have the effect of $C_{in}$, that is, filtering out the high frequency signal and reducing the ripple.

In the embodiments, each voltage reduction sub-circuit 221 may reduce the output voltage of the voltage reduction sub-circuit 221 to half of the input voltage of the voltage reduction sub-circuit 221, and increase the output current of the voltage reduction sub-circuit 221 to twice the intensity of the input current of the voltage reduction sub-circuit 221. Therefore, when the voltage reduction circuit 220 includes two voltage reduction sub-circuits, the voltage reduction circuit 220 may reduce the output voltage of the voltage reduction circuit 220 to one quarter of the input voltage of the voltage reduction circuit 220, and increase the output current of the voltage reduction circuit 220 to quadruple the intensity of the input current of the voltage reduction circuit 220, such that the charging time is greatly reduced.

Referring back to FIG. 2, the charging circuit further includes a protection circuit 230 and a simulation circuit 240, the protection circuit 230 is connected to the simulation circuit 240, and the simulation circuit 240 is respectively connected to the voltage reduction circuit 220 and the control circuit 210.

The protection circuit 230 is configured to obtain the input voltage of the voltage reduction circuit, and output the input voltage to the simulation circuit 240.

The simulation circuit 240 is configured to sample the input voltage and the output voltage of the voltage reduction circuit 220, generate an abnormal signal when abnormal charging is determined based on the input voltage and the output voltage, and send the abnormal signal to the control circuit 210.

The control circuit 210 is further configured to forbid the voltage reduction circuit 220 to obtain the input voltage based on the abnormal signal.

A backward diode may be provided at each pin of a power management IC (PMI) when the charging circuit is provided in the PMI, and the backward diode herein is configured as the protection circuit 230. The backward diode at a certain pin may be conducted when the pin is abnormal, such that overcurrent, overvoltage and short circuit may occur at the input terminal and/or the output terminal. It can be seen that, the protection circuit 230 may protect the PMI, including overvoltage protection of the input terminal, overcurrent protection of the input terminal, overvoltage protection of the battery 270 of the output terminal, overcurrent protection of the output terminal, short circuit protection and the like.

The simulation circuit 240 may detect an output voltage of the voltage reduction circuit 220, a charging current of the battery 270, a current voltage of the battery 270 and the like. In this way, the battery 270 may be charged with a constant current (i.e., a maximum current) in an initial charging and, to improve charging efficiency; the voltage of the battery 270 is detected during charging. When the voltage of the battery 270 reaches the rated voltage, the charging mode is switched to a constant-voltage charging mode and the charging current is reduced gradually, such that damage of the battery 270 due to the voltage of the battery 270 being greater than the rated voltage caused by charging the battery with the constant-current mode constantly may be avoided. In the embodiments, the simulation circuit 240 may obtain the foregoing parameters by detecting a detection resistor 260 illustrated as FIG. 2. Therefore, in order to ensure accuracy of the parameters, precision and temperature drift of the detection resistor 260 may need to be taken into consideration.

The simulation circuit 240 may further sample the input voltage at the protection circuit 230. The input voltage is compared with the output voltage of the voltage reduction circuit 220 via a comparator. An abnormal signal is generated and sent to the control circuit 210 when it is determined that charging processing of the battery 270 is abnormal based on the comparison result. The control circuit 210 controls a switch (shown in FIG. 2) between the voltage reduction circuit 220 and a voltage input terminal V250 to be switched off, and controls a switch (not shown in FIG. 2) between the voltage reduction circuit 220 and the battery 270 to be switched off, to forbid the battery 270 to be charged from the voltage input terminal V250, such that the battery 270 is protected. The abnormal signal may be a work state such as an overvoltage state and an overcurrent state. The control circuit 210 reports the foregoing work states to a processor of the terminal, and the processor then prompts the user that charging is abnormal. The simulation circuit 240 does not send the signal to the control circuit 210 when it is determined the charging processing of the battery 270 is normal based on the comparison result, and the control circuit 210 controls the voltage reduction circuit 220 to perform the voltage reduction processing on the input voltage according to the generation frequency of the control signal set by itself, to charge the battery 270.

In some embodiments, the simulation circuit 240 is further configured to compare the output voltage with a first operating voltage and a second operating voltage, in which, the second operating voltage is greater than the first operating voltage; when the output voltage is lower than the first operating voltage, generate a first feedback signal and send the first feedback signal to the control circuit 210; when the output voltage is greater than the second operating voltage, generate a second feedback signal and send the second feedback signal to the control signal 210.

The control signal 210 is further configured to increase the generation frequency of the control signal when the first feedback signal is obtained, and reduce the generation frequency of the control signal when the second feedback signal is obtained.

In the simulation circuit 240, a first operating voltage and a second operating voltage are preset. The first operating voltage herein may refer to the minimum operating voltage in normal work, and the second operating voltage may refer to the maximum operating voltage in normal work. The output voltage is compared respectively with the first operating voltage and the second operating voltage after the simulation circuit 240 collects the output voltage. The simulation circuit 240 may generate the first feedback signal and send the first feedback signal to the control circuit 210 when the output voltage is lower than the first operating voltage. A frequency adjustment circuit is provided inside the control circuit 210. The frequency adjustment circuit may increase the frequency of the switch in the voltage reduction sub-circuit 221, i.e., increasing the output frequency of the control signal, when the first feedback signal is received. In this case, occurrences of switching on and off the switch in the voltage reduction sub-circuit 221 may be increased in unit time, and energy storage ability of the capacitive circuit is strengthened in unit time, such that an objective of increasing the output voltage of the voltage reduction sub-circuit 221 can be achieved. Similarly, the simulation circuit 240 may generate the second feedback signal and send the second feedback signal to the control circuit 210 when the output voltage is greater than the second operating voltage. The frequency adjustment circuit is provided inside the control circuit 210. The frequency adjustment circuit may decrease the frequency of the switch in the voltage reduction sub-circuit 221, i.e., reducing the output frequency of the control signal, when the second feedback signal is received. In this case, occurrences of switching on and off the switch in the voltage reduction sub-circuit 221 are decreased in unit time, and energy storage ability of the capacitive circuit is weakened in unit time, such that an objective of reducing the output voltage of the voltage reduction sub-circuit 221 can be achieved.

In some embodiments, the processor in the terminal may further send instructions to the control circuit 210, and the control circuit 210 then controls the charging circuit based on the instructions. The control circuit 210 may be a digital control circuit.

It should be noted that, if the energy is stored with an inductive circuit, because the power consumption may be high, each voltage reduction sub-circuit 221 may need to be provided on a chip. In this case, a plurality of chips may need to be provided in a main board, which has high requirement on the stack layout and troublesome in heat dissipation. However, in the embodiments, the energy is stored with the capacitive circuit, and since the power consumption is low, all the voltage reduction sub-circuits 221 may be provided on one chip. In this way, design of the chip may be simplified, space of the main board may further be saved, and it is beneficial to the heat dissipation of components in the main board.

With the charging circuit provided in the present disclosure, the voltage reduction processing is performed by the voltage reduction circuit on the input current and then the output current is outputted. Since the output current corresponding to the output voltage is greater than the input current corresponding to the input voltage, the output current may be increased when the voltage reduction processing is performed on the input voltage, so as to enable the output current to be high while the input current is low. In this way, charging efficiency of the battery may be improved with a higher output current, and a charging line may be made thinner when the input current is lower, such that cost of the charging line is reduced.

In the embodiments, the energy is stored with the capacitive circuit, and since the power consumption is low, all the voltage reduction sub-circuits may be provided on one chip. In this way, the design of the chip may be simplified, the space of the main board may further be saved, and it is beneficial to the heat dissipation of components in the main board.

Embodiments of the present disclosure also provide a terminal which includes a charging circuit illustrated in FIG. 2 to FIG. 8.

With the terminal provided in the present disclosure, the voltage reduction processing is performed by the voltage reduction circuit in the charging circuit on the input current and then the output current is outputted. Since an output current corresponding to an output voltage is greater than an input current corresponding to an input voltage, the output current may be increased when the voltage reduction processing is performed on the input voltage, so as to enable the output current to be high while the input current is low. In this way, charging efficiency of a battery may be improved with a higher output current, and a charging line may be made thinner when the input current is lower, such that cost of the charging line is reduced.

Figure 9:
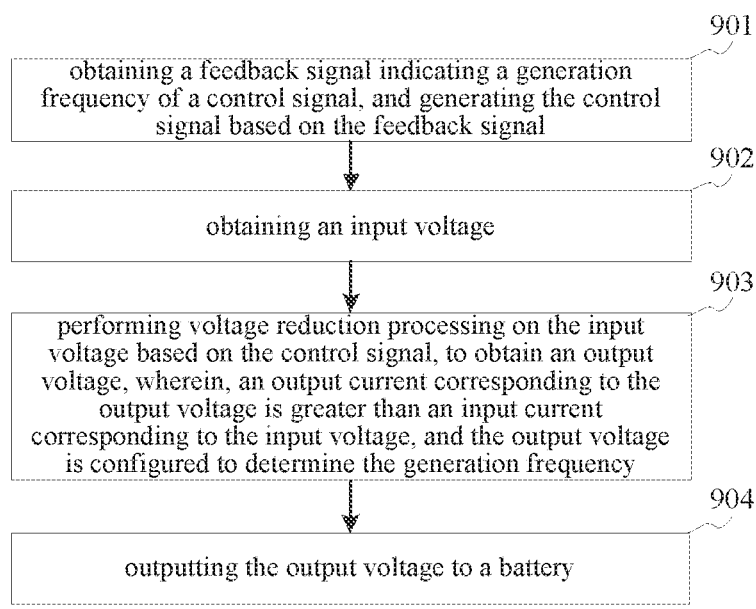
FIG. 9 is a flow chart illustrating a charging method according to an embodiment of the present disclosure.

FIG. 9 is a flow chart illustrating a charging method according to an embodiment of the present disclosure. The charging method is applied to a terminal. As illustrated in FIG. 9, the charging method includes the followings.

At block 901, a feedback signal indicating a generation frequency of a control signal is obtained, and the control signal is generated based on the feedback signal.

At block 902, an input voltage is obtained.

At block 903, voltage reduction processing is performed on the input voltage based on the control signal to obtain an output voltage, in which, an output current corresponding to the output voltage is greater than an input current corresponding to the input voltage, and the output voltage is configured to determine the generation frequency.

At block 904, the output voltage is outputted to a battery.

With the charging method provided in the present disclosure, since the output current corresponding to the output voltage is greater than the input current corresponding to the input voltage, the output current may be increased when the voltage reduction processing is performed on the input voltage, so as to enable the output current to be high while the input current is low. In this way, charging efficiency of the battery may be improved with a higher output current, and a charging line may be made thinner when the input current is lower, such that cost of the charging line is reduced.

Figure 10:
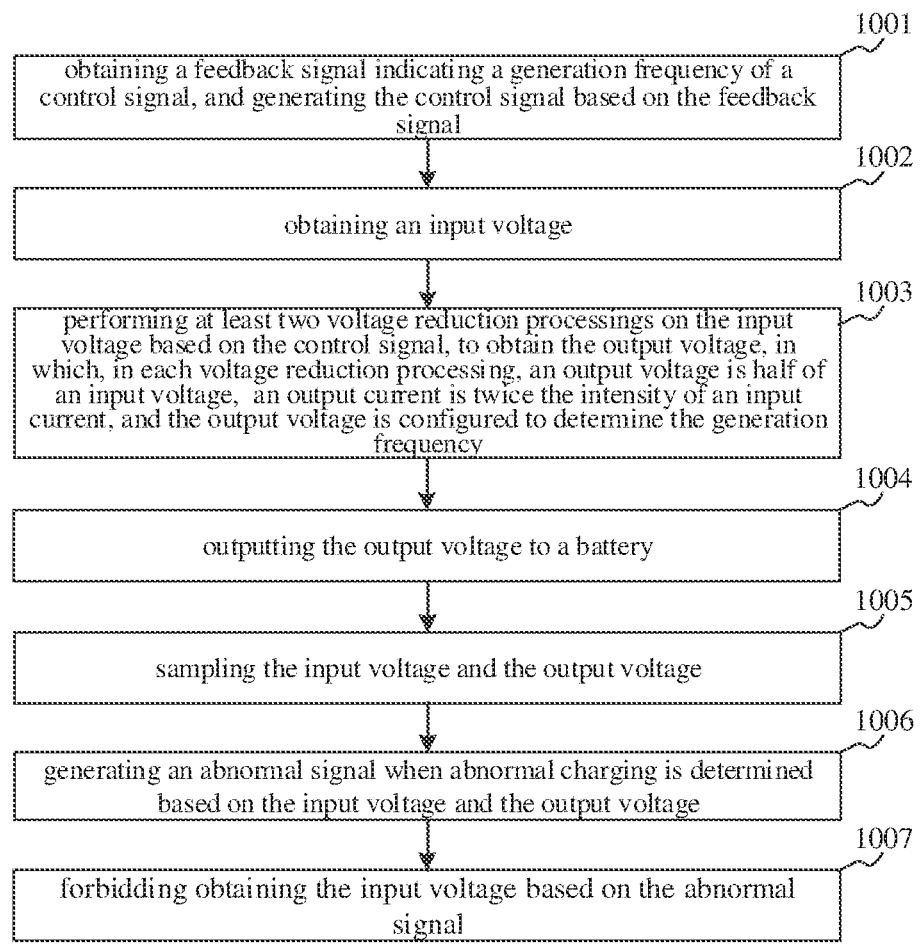
FIG. 10 is a flow chart illustrating a charging method according to an embodiment of the present disclosure.

FIG. 10 is a flow chart illustrating a charging method according to an embodiment of the present disclosure. The charging method is applied to a terminal. As illustrated in FIG. 10, the charging method includes the followings.

In block 1001, a feedback signal indicating a generation frequency of a control signal is obtained, and the control signal is generated based on the feedback signal.

The control signal is configured to control a voltage reduction circuit to perform voltage reduction processing on the input voltage. The control signal may be configured to control a timing of switching on and off a switch when the voltage reduction circuit implements the voltage reduction processing by the switch.

In block 1002, an input voltage is obtained.

An input voltage of the voltage reduction circuit is provided after a charger of the terminal is connected to a power supply, which may be a direct current voltage obtained after a charger converts an alternating current voltage. Since voltage reduction processing may be performed on the input voltage, the output voltage outputted to a battery is within a range of a rated voltage (such as 4.4V) of the battery. The input voltage may be a voltage which does not exceed a safety voltage threshold (such as 36V) specified by, e.g., the national standard, such as 14-22V, which is not limited in the embodiments.

In block 1003, at least two voltage reduction processings are performed on the input voltage based on the control signal to obtain the output voltage. For each voltage reduction processing, an output voltage is half of an input voltage, an output current is twice the intensity of an input current, and the output voltage is configured to determine a generation frequency.

When the voltage reduction circuit includes at least two voltage reduction sub-circuits, in which, each voltage reduction sub-circuit includes a switching circuit, a first capacitive circuit and a second capacitive circuit, and the switching circuit includes a first switch, a second switch, a third switch and a fourth switch, performing the at least two voltage reduction processings on the input voltage based on the control signal to obtain the output voltage may be implemented as follows.

For each voltage reduction processing, the first capacitive circuit and the second capacitive circuit connected in series are controlled to be charged from the input voltage based on the control signal when the control signal is configured to control the first switch and the fourth switch to be switched on, and the second switch and the third switch to be switched off. In this case, the first capacitive circuit and the second capacitive circuit are connected in series. Since a capacitance value of the first capacitive circuit is equal to that of the second capacitive circuit, the first capacitive circuit and the second capacitive circuit are charged at the same time, and energy stored by the first capacitive circuit is equal to that stored by the second capacitive circuit. That is, both the voltage in the first capacitive circuit and the voltage in the second capacitive circuit are half of the input voltage of the voltage reduction sub-circuit, and both the current flowing through the first capacitive circuit and the current flowing through the second capacitive circuit are the input current of the voltage reduction sub-circuit.

The first capacitive circuit and the second capacitive circuit connected in parallel are controlled to output voltage to the battery based on the control signal when the control signal is configured to control the third switch and the fourth switch to be switched on, and the first switch and the second switch to be switched off. In this case, the first capacitive circuit and the second capacitive are connected in parallel. Since the energy stored in the first capacitive circuit is equal to that stored by the second capacitive circuit, both the voltage in the first capacitive circuit and the voltage in the second capacitive circuit are half of the input voltage of the voltage reduction sub-circuit, i.e., the output voltage of the voltage reduction sub-circuit is half of the input voltage of the voltage reduction sub-circuit, and both the current flowing through the first capacitive circuit and the current flowing through the second capacitive circuit are the input current of the voltage reduction sub-circuit, i.e., the output current of the voltage reduction sub-circuit is twice the intensity of the input current of the voltage reduction sub-circuit.

In some embodiments, the voltage applied to the battery may be increased when the at least two voltage reduction sub-circuits work at the same time, such that the voltage is greater than a rated voltage of the battery, resulting in damaging the battery. Therefore, to ensure that respective voltage reduction sub-circuits work reasonably, the voltage reduction circuit may further include an energy transfer circuit, and the energy transfer circuit is between two neighboring voltage reduction sub-circuits. The energy transfer circuit includes a fifth switch, a sixth switch and a third capacitive circuit. In this case, performing the at least two voltage reduction processings on the input voltage based on the control signal to obtain the output voltage may be implemented as follows.

For each voltage reduction processing, the third capacitive circuit is controlled to be charged from the output voltage of the preceding voltage reduction processing based on the control signal when the control signal is configured to control the fifth switch to be switched on, and the sixth switch to be switched off. In this case, the first capacitive circuit and the second capacitive circuit in the preceding voltage reduction sub-circuit output the energy stored therein to the third capacitive circuit.

The third capacitive circuit is controlled to output voltage to the succeeding voltage reduction processing based on the control signal when the control signal is configured to control the fifth switch to be switched off, and the sixth switch to be switched on. In this case, the third capacitive circuit outputs the energy stored therein to the first capacitive circuit and the second capacitive circuit in the succeeding voltage reduction sub-circuit.

In block 1004, the output voltage is output to a battery.

In the embodiments, each voltage reduction sub-circuit may reduce the output voltage of the voltage reduction sub-circuit to half of the input voltage of the voltage reduction sub-circuit, and increase the output current of the voltage reduction sub-circuit to twice the intensity of the input current of the voltage reduction sub-circuit. Therefore, when the voltage reduction circuit includes two voltage reduction sub-circuits, the voltage reduction circuit may reduce the output voltage of the voltage reduction circuit to a quarter the input voltage of the voltage reduction circuit, and increase the output current of the voltage reduction circuit to four times the intensity of the input current of the voltage reduction circuit, such that charging time may be greatly shortened.

The battery is charged with a constant current (i.e., a maximum current) in an initial charging and, to improve charging efficiency; the voltage of the battery is detected during charging. When the voltage of the battery reaches the rated voltage, the charging mode is switched to a constant-voltage charging mode is transferred again and the charging current is reduced gradually, such that damage of the battery due to the voltage of the battery greater than the rated voltage caused by charging the battery with the constant-current mode constantly may be avoided.

In some embodiments, the charging processing may be monitored by executing acts at blocks 1005-1007, such that the charging is stopped in abnormal charging, to protect the battery.

In block 1005, the input voltage and the output voltage are sampled.

The input voltage and the output voltage are sampled by the simulation circuit, and the input voltage is compared with the output voltage via a comparator. The operation at block 1006 is executed when it is determined that the charging processing of the battery is abnormal based on the comparison result. The operation at block 1005 is executed continuously when it is determined that the charging processing of the battery is normal based on the comparison result. The sampling is stopped until the charging is finished.

In block 1006, an abnormal signal is generated when abnormal charging is determined based on the input voltage and the output voltage.

The simulation circuit may generate the abnormal signal, and send the abnormal signal to the control circuit. The abnormal signal may be a work state such as an overvoltage state and an overcurrent state.

In block 1007, obtaining the input voltage is forbidden based on the abnormal signal.

The control circuit controls a switch (shown in FIG. 2) between the voltage reduction circuit and a voltage input terminal V to be switched off, and controls a switch (not shown in FIG. 2) between the voltage reduction circuit and the battery to be switched off, to forbid the battery to be charged from the voltage input terminal V, such that the battery is protected.

In some embodiments, the control circuit may further report the abnormal signal to a processor of the terminal, and the processor then prompts the user that the charging is abnormal.

In some embodiments, the method further includes: comparing the output voltage with a first operating voltage and a second operating voltage, in which, the second operating voltage is greater than the first operating voltage; when the output voltage is lower than the first operating voltage, generating a first feedback signal and increasing the generation frequency of the control signal based on the first feedback signal; when the output voltage is greater than the second operating voltage, generating a second feedback signal and reducing the generation frequency of the control signal based on the second feedback signal.

In the simulation circuit, a first operating voltage and a second operating voltage are preset. The first operating voltage herein may refer to the minimum operating voltage in normal work, and the second operating voltage may refer to the maximum operating voltage in normal work. The output voltage is compared respectively with the first operating voltage and the second operating voltage after the simulation circuit collects the output voltage. The simulation circuit may generate the first feedback signal and send the first feedback signal to the control circuit when the output voltage is lower than the first operating voltage. A frequency adjustment circuit is provided inside the control circuit. The frequency adjustment circuit may increase a frequency of a switch in the voltage reduction sub-circuit, i.e., increasing the output frequency of the control signal, when the first feedback signal is received. In this case, occurrences of switching on and off the switch in the voltage reduction sub-circuit are increased in unit time, and energy storage ability of the capacitive circuit is strengthened in unit time, such that an objective of increasing the output voltage of the voltage reduction sub-circuit can be achieved. Similarly, the simulation circuit may generate the second feedback signal and send the second feedback signal to the control circuit when the output voltage is greater than the second operating voltage. The frequency adjustment circuit is provided inside the control circuit. The frequency adjustment circuit may reduce the frequency of the switch in the voltage reduction sub-circuit, i.e., reducing the output frequency of the control signal, when the second feedback signal is received. In this case, occurrences of switching on and off the switch in the voltage reduction sub-circuit are decreased in unit time, and energy storage ability of the capacitive circuit is weakened in unit time, such that an objective of reducing the output voltage of the voltage reduction sub-circuit can be achieved.

With the charging methods provided in the present disclosure, since the output current corresponding to the output voltage is greater than the input current corresponding to the input voltage, the output current may be increased when voltage reduction processing is performed on the input voltage, so as to enable the output current to be high while the input current is low. In this way, charging efficiency of the battery may be improved with a higher output current, and a charging line may be made thinner when the input current is lower, such that cost of the charging line is reduced.

Figure 11:
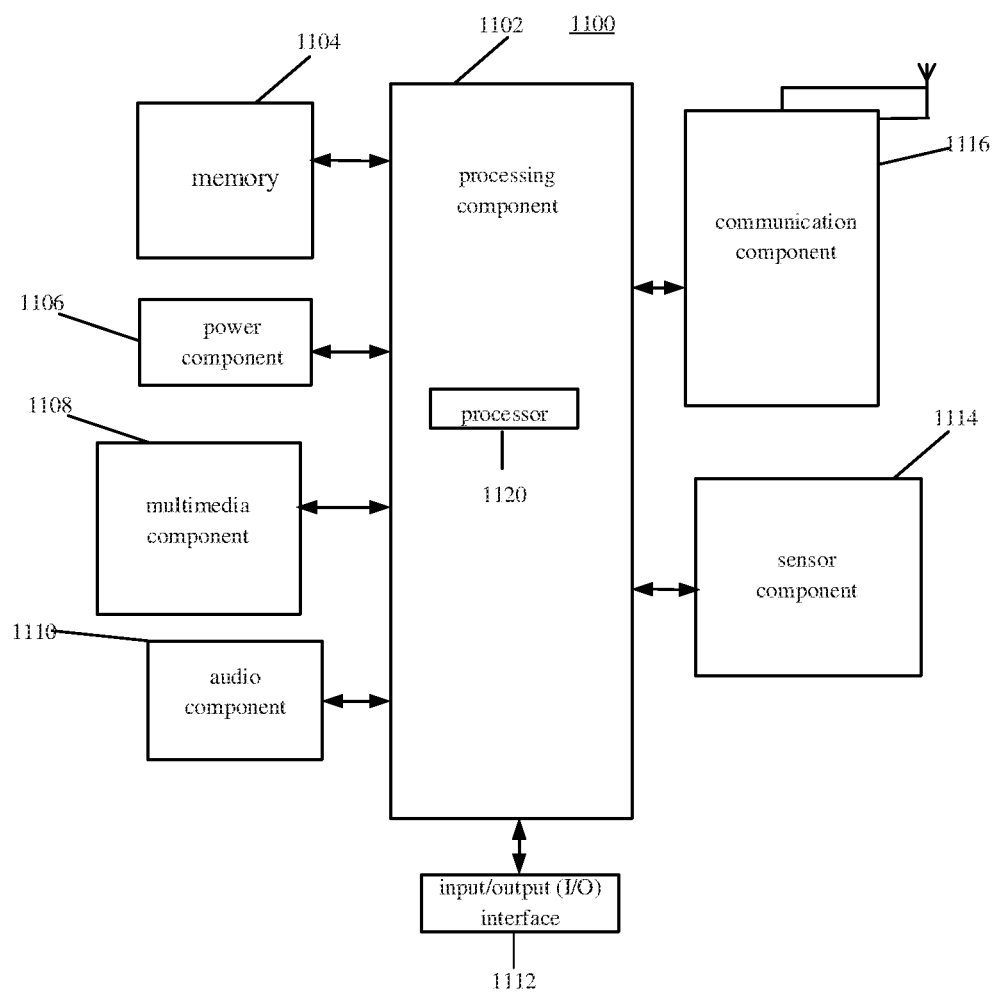
FIG. 11 is a block diagram illustrating a terminal according to an embodiment of the present disclosure.

FIG. 11 is a block diagram illustrating a terminal 1100 according to an embodiment of the present disclosure. For example, the terminal 1100 may be a mobile phone, a computer, a digital broadcast terminal, a messaging device, a gaming console, a tablet device, a medical device, a fitness device, a personal digital assistant, and the like.

As illustrated in FIG. 11, the terminal 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 usually controls overall operation of the terminal 1100, such as operations associated with display, telephone calls, data communications, camera operations, and recording operations. The processing component 1102 may include one or more processors 1120 to execute instructions, to complete all or part of the operations in the above described methods. In addition, the processing component 1102 may include one or more modules which facilitate interaction between the processing component 1102 and other components. For instance, the processing component 1102 may include a multimedia module to facilitate interaction between the multimedia component 1108 and the processing component 1102.

The memory 1104 is configured to store various types of data to support operations at the terminal 1100. Examples of such data include instructions for any applications or methods operated on the terminal 1100, contact data, phonebook data, messages, pictures, videos, etc. The memory 1104 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the terminal 1100. The power component 1106 may include a power management system, one or more power supplies, and other components related to generation, management, and distribution of power in the terminal 1100.

The multimedia component 1108 includes a screen that provides an output interface between the terminal 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1108 includes a front camera and/or a rear camera. When the terminal 1100 is in an operation mode, such as a photographing mode or a video mode, the front camera and/or the rear camera may receive external multimedia data. Each of the front and rear cameras may be a fixed optical lens system or have a focus and optical zoom capability.

The audio component 1110 is configured to output and/or input audio signals. For example, the audio component 1110 includes a microphone (MIC) configured to receive an external audio signal when the terminal 1100 is in an operating mode, such as a call mode, a recording mode, and a speech recognition mode. The received audio signal may be further stored in the memory 1104 or transmitted via the communication component 1116. In some embodiments, the audio component 1110 further includes a loudspeaker, which is configured to output the audio signals.

The I/O interface 1112 provides an interface between the processing component 1102 and a peripheral interface module, such as a keyboard, a click wheel, a button and the like. The buttons may include, but are not limited to, a home button, a volume button, a starting button, and a locking button.

The sensor component 1114 includes one or more sensors for providing status assessments of various aspects of the terminal 1100. For example, the sensor component 1114 may detect an open/closed state of the terminal 1100, relative positioning of the components, such as the display and the keypad of the terminal 1100, a change in position of the terminal 1100 or of a component of the terminal 1100, presence or absence of user contact with that terminal 1100, an orientation or an acceleration/deceleration of the terminal 1100, and a change in temperature of the terminal 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate wired or wireless communication between the terminal 1100 and other devices. The terminal 1100 can access a wireless network based on a communication standard, such as WiFi, 2G, or 3G, or a combination of them. In an exemplary embodiment, the communication component 1116 receives a broadcast signal or broadcast related information from an external broadcast management system via a broadcast channel. In an exemplary embodiment, the communication component 1116 further includes a near field communication (NFC) module to facilitate short-range communication. The communication component 1116 may also be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In exemplary embodiments, there is also provided a non-transitory computer readable storage medium including instructions, such as the instructions included in the memory 1104. The instructions can be executed by the processor 1120 of the terminal 1100 to perform the methods described above. For example, the non-transitory computer readable storage medium may be a ROM, a random access memory (RAM), a CD-ROM, a magnetic tape, a floppy disk, an optical data storage device, and the like.

Other embodiments of the present disclosure will be readily apparent to those skilled in the art after the description is considered and the disclosure herein is practiced. The present application is intended to cover any variations, uses or adaptations of the present disclosure. The variations, uses or adaptations follow general principles of the present disclosure and include common knowledge or conventional techniques in the field of the technology, which are not disclosed in the present disclosure. The embodiments are considered to be merely exemplary, and the true scope and spirit of this present disclosure is indicated by the claims below.

It should be understood that, the present disclosure is not limited to the structure described above and illustrated in the accompanying drawings, and may be modified and altered without departing from the scope of the present disclosure. The scope of the present disclosure is determined by the accompanying claims.

What is claimed is:

1. A charging circuit, comprising:
a control circuit; and
a voltage reduction circuit connected to the control circuit;

wherein the control circuit is configured to obtain a feedback signal indicating a generation frequency of a control signal, generate the control signal based on the feedback signal, and send the control signal to the voltage reduction circuit; and the voltage reduction circuit is configured to obtain an input voltage and the control signal, perform voltage reduction processing on the input voltage based on the control signal and output an output voltage to a battery, wherein an output current corresponding to the output voltage is greater than an input current corresponding to the input voltage, the output voltage is configured to determine the generation frequency, and the voltage reduction circuit comprises at least two cascaded voltage reduction sub-circuits, wherein an output voltage of a voltage reduction sub-circuit is half of an input voltage inputted to the voltage reduction sub-circuit, and an output current of the voltage reduction sub-circuit is double of an input current inputted to the voltage reduction sub-circuit; and an operating frequency of a preceding one of the at least two cascaded voltage reduction sub-circuits is greater than that of a succeeding one of the at least two cascaded voltage reduction sub-circuits, and the operating frequency is a frequency of switching on and off a switch in the corresponding voltage reduction sub-circuit.

2. The charging circuit according to claim 1, wherein the voltage reduction sub-circuit comprises a switching circuit, a first capacitive circuit, and a second capacitive circuit, the first capacitive circuit and the second capacitive circuit are respectively connected to the switching circuit, and a capacitance value of the first capacitive circuit is equal to that of the second capacitive circuit;

the first capacitive circuit and the second capacitive circuit are connected in series when the switching circuit is in a first state; and the first capacitive circuit and the second capacitive circuit are connected in parallel when the switching circuit is in a second state.

3. The charging circuit according to claim 2, wherein the switching circuit comprises a first switch, a second switch, a third switch, and a fourth switch;

a first end of the first switch and a first end of the second switch are respectively configured as input terminals of the voltage reduction sub-circuit, a second end of the first switch is respectively connected to a first end of the first capacitive circuit and a first end of the third switch, a second end of the third switch is grounded, a second end of the second switch is respectively connected to a second end of the first capacitive circuit and a first end of the fourth switch, and a second end of the fourth switch is configured as an output terminal of the voltage reduction sub-circuit; and a first end of the second capacitive circuit is connected to the second end of the fourth switch, and a second end of the second capacitive circuit is grounded.

4. The charging circuit according to claim 3, wherein:

the first capacitive circuit and the second capacitive circuit connected in series are in a charging state of being charged from the input voltage of the voltage reduction sub-circuit when the control signal is configured to control the first switch and the fourth switch to be switched on, and the second switch and the third switch to be switched off; and the first capacitive circuit and the second capacitive circuit connected in parallel are in a discharging state of outputting voltage to the battery when the control signal is configured to control the third switch and the fourth switch to be switched on, and the first switch and the second switch to be switched off.

5. The charging circuit according to claim 1, wherein the voltage reduction circuit further comprises an energy transfer circuit, and the energy transfer circuit is located between two neighboring voltage reduction sub-circuits;

the energy transfer circuit comprises a fifth switch, a sixth switch, and a third capacitive circuit; and a first end of the fifth switch is connected to an output end of a first one of the two neighboring voltage reduction sub-circuits, a second end of the fifth switch is respectively connected to a first end of the third capacitive circuit and a first end of the sixth switch, a second end of the third capacitive circuit is grounded, and a second end of the sixth switch is connected to an input end of a second one of the two neighboring voltage reduction sub-circuits.

6. The charging circuit according to claim 5, wherein:

the third capacitive circuit is in a charging state of being charged from a preceding one of the two neighboring voltage reduction sub-circuits when the control signal is configured to control the fifth switch to be switched on, and the sixth switch to be switched off; and the third capacitive circuit is in a discharging state of outputting voltage to a succeeding one of the two neighboring voltage reduction sub-circuits when the control signal is configured to control the fifth switch to be switched off, and the sixth switch to be switched on.

7. The charging circuit according to claim 1, wherein, the charging circuit further comprises a protection circuit and a simulation circuit, the protection circuit is connected to the simulation circuit, and the simulation circuit is respectively connected to the voltage reduction circuit and the control circuit;

the protection circuit is configured to obtain the input voltage of the voltage reduction circuit, and output the input voltage to the simulation circuit;

the simulation circuit is configured to sample the input voltage and the output voltage of the voltage reduction circuit, generate an abnormal signal when abnormal charging is determined based on the input voltage and the output voltage, and send the abnormal signal to the control circuit; and the control circuit is further configured to forbid the voltage reduction circuit to obtain the input voltage based on the abnormal signal.

8. The charging circuit according to claim 7, wherein:

the simulation circuit is further configured to:

compare the output voltage with a first operating voltage and a second operating voltage, wherein the second operating voltage is greater than the first operating voltage;

when the output voltage is lower than the first operating voltage, generate a first feedback signal and send the first feedback signal to the control circuit; and when the output voltage is greater than the second operating voltage, generate a second feedback signal and send the second feedback signal to the control circuit; and the control circuit is further configured to increase the generation frequency of the control signal when the first feedback signal is obtained; reduce the generation frequency of the control signal when the second feedback signal is obtained.

9. The charging circuit according to claim 1, wherein the control circuit is a digital control circuit.

10. A terminal, comprising a charging circuit, wherein the charging circuit comprises:
a control circuit; and
a voltage reduction circuit connected to the control circuit;
wherein the control circuit is configured to obtain a feedback signal indicating a generation frequency of a control signal, generate the control signal based on the feedback signal, and send the control signal to the voltage reduction circuit; and
the voltage reduction circuit is configured to obtain an input voltage and the control signal, perform voltage reduction processing on the input voltage based on the control signal and output an output voltage to a battery, wherein an output current corresponding to the output voltage is greater than an input current corresponding to the input voltage, the output voltage is configured to determine the generation frequency, and the voltage reduction circuit comprises at least two cascaded voltage reduction sub-circuits, wherein
an output voltage of a voltage reduction sub-circuit is half of an input voltage inputted to the voltage reduction sub-circuit, and an output current of the voltage reduction sub-circuit is double of an input current inputted to the voltage reduction sub-circuit; and
an operating frequency of a preceding one of the at least two cascaded voltage reduction sub-circuits is greater than that of a succeeding one of the at least two cascaded voltage reduction sub-circuits, and the operating frequency is a frequency of switching on and off a switch in the corresponding voltage reduction sub-circuit.

11. A charging method, applicable to a terminal according to claim 10, wherein the charging method comprises:
obtaining a feedback signal indicating a generation frequency of a control signal, and generating the control signal based on the feedback signal;
obtaining an input voltage;
performing voltage reduction processing on the input voltage based on the control signal to obtain an output voltage, wherein, an output current corresponding to the output voltage is greater than an input current corresponding to the input voltage, and the output voltage is configured to determine the generation frequency; and
outputting the output voltage to a battery.

12. The method according to claim 11, wherein performing voltage reduction processing on the input voltage based on the control signal to obtain the output voltage comprises:
performing at least two voltage reduction processings on the input voltage based on the control signal to obtain the output voltage, wherein, for each voltage reduction processing, an output voltage is half of an input voltage, and an output current is double of an input current.

13. The method according to claim 12, wherein each voltage reduction processing is implemented by a voltage reduction sub-circuit comprising a first switch, a second switch, a third switch, a fourth switch, a first capacitive circuit and a second capacitive circuit, and performing at least two voltage reduction processings on the input voltage based on the control signal to obtain the output voltage comprises:
for each voltage reduction processing, controlling the first capacitive circuit and the second capacitive circuit connected in series to be charged from the input voltage based on the control signal when the control signal is configured to control the first switch and the fourth switch to be switched on, and the second switch and the third switch to be switched off; and
controlling the first capacitive circuit and the second capacitive circuit connected in parallel to output voltage to the battery based on the control signal when the control signal is configured to control the third switch and the fourth switch to be switched on, and the first switch and the second switch to be switched off.

14. The method according to claim 12, wherein each voltage reduction processing is implemented by an energy transfer circuit comprising a fifth switch, a sixth switch and a third capacitive circuit, and performing at least two voltage reduction processings on the input voltage based on the control signal to obtain the output voltage comprises:
for each voltage reduction processing, controlling the third capacitive circuit to be charged from the output voltage outputted by a previous voltage reduction processing based on the control signal when the control signal is configured to control the fifth switch to be switched on, and the sixth switch to be switched off; and controlling the third capacitive circuit to output voltage to a following voltage reduction processing based on the control signal when the control signal is configured to control the fifth switch to be switched off, and the sixth switch to be switched on.

15. The method according to claim 11, further comprising:
sampling the input voltage and the output voltage;
generating an abnormal signal when abnormal charging is determined based on the input voltage and the output voltage; and
forbidding obtaining the input voltage based on the abnormal signal.

16. The method according to claim 11, further comprising:
comparing the output voltage with a first operating voltage and a second operating voltage, wherein the second operating voltage is greater than the first operating voltage;
when the output voltage is lower than the first operating voltage, generating a first feedback signal and increasing the generation frequency of the control signal based on the first feedback signal; and
when the output voltage is greater than the second operating voltage, generating a second feedback signal and reducing the generation frequency of the control signal based on the second feedback signal.

* * * * *